United States Patent
Kleppen, Jr.

[15] 3,703,622
[45] Nov. 21, 1972

[54] GAS-SHIELDED ARC TORCH

[72] Inventor: Arthur L. Kleppen, Jr., Kent, Wash.

[73] Assignee: Conley and Kleppen Enterprises, Inc., Kent, Wash.

[22] Filed: Dec. 1, 1971

[21] Appl. No.: 203,776

[52] U.S. Cl. ..................219/75, 219/120, 219/130
[51] Int. Cl. ....................................B23k 9/16
[58] Field of Search ......219/75, 74, 130, 121 P, 121, 219/138, 70, 120

[56] References Cited

UNITED STATES PATENTS

| 3,238,350 | 3/1966 | Klasson et al............219/75 |
| 2,820,075 | 1/1958 | Upton.................219/120 X |
| 2,943,183 | 6/1960 | Simms et al............219/75 X |
| 3,056,018 | 9/1962 | Peterson................219/75 X |

Primary Examiner—J. V. Truhe
Assistant Examiner—B. A. Reynolds
Attorney—Ford E. Smith

[57] ABSTRACT

A gas-shielded arc torch has a flexible shank between the head and the handle and is constructed to employ the inflowing gas to cool the electrode and head, thus maintaining high capacity in the torch, while permitting its production in reduced scale.

4 Claims, 3 Drawing Figures

PATENTED NOV 21 1972 3,703,622

GAS-SHIELDED ARC TORCH

BACKGROUND OF THE INVENTION

It has been a continuing desire in the manufacture of arc torches (a) to reduce the dimensions of the torch to a minimum to permit working in restricted areas; (b) to include flexibility between the handle and the torch head to permit directing the electrode at hard-to-reach locations; and (c) to maintain high capacity of the torch by providing cooling functions. The customary practice as to torch cooling has been to provide coolant passages in the shank and head whereby inflowing and reverse flowing coolant such as water absorbs and carries away heat. When the passages are small and restricted as when a head is made very small the cooling efficiency is generally very low. Also, since the conduit means forming the coolant passages and gas conduit must be included in the handle and shank supporting the head, it has been practically impossible to provide a flexible yet small and compact arc torch and one easily manipulated.

The primary object of this invention is to reduce the size of the torch head to provide a flexible shank while providing cooling efficiency and consequent high current-carrying capacity of gas-shielded arc torches.

SUMMARY OF THE INVENTION

A metal torch head supports an electrode and a gas-directing nozzle and has a transversely disposed neck at one side by which gas is conducted into the head and electrical current to the electrode. The torch head is devoid of coolant passages and therefore, by comparison with prior constructions, may be very small and compact. A helical gas conduit of cylindriform is secured to the neck of the head and functions in part as a current conductor as well as a heat transfer member. Within the helical gas conductor, which is flexible, is an uninsulated multi-stranded main current conductor secured at its end by solder techniques at remote parts of the gas-conducting helix providing a shortened electrical path without materially affecting flexibility. This current conductor is swelled during manufacture within the coils of the helix establishing intimate contact with the inner surfaces of such coils for enhanced heat transfer functions. A molded elastomeric insulative body covers the head and said gas and current conducting assembly, thus providing a shank-covering that does not materially impede flexibility of the helical element. A hollow non-conductive handle is attached to the flexible shank. Gas and current supply conduit means are introduced into the rear end of the hollow handle and coupling with the outer end of said flexible helical element takes place therein and is shielded.

DESCRIPTION OF THE INVENTION

Figures 1, 2, 3:
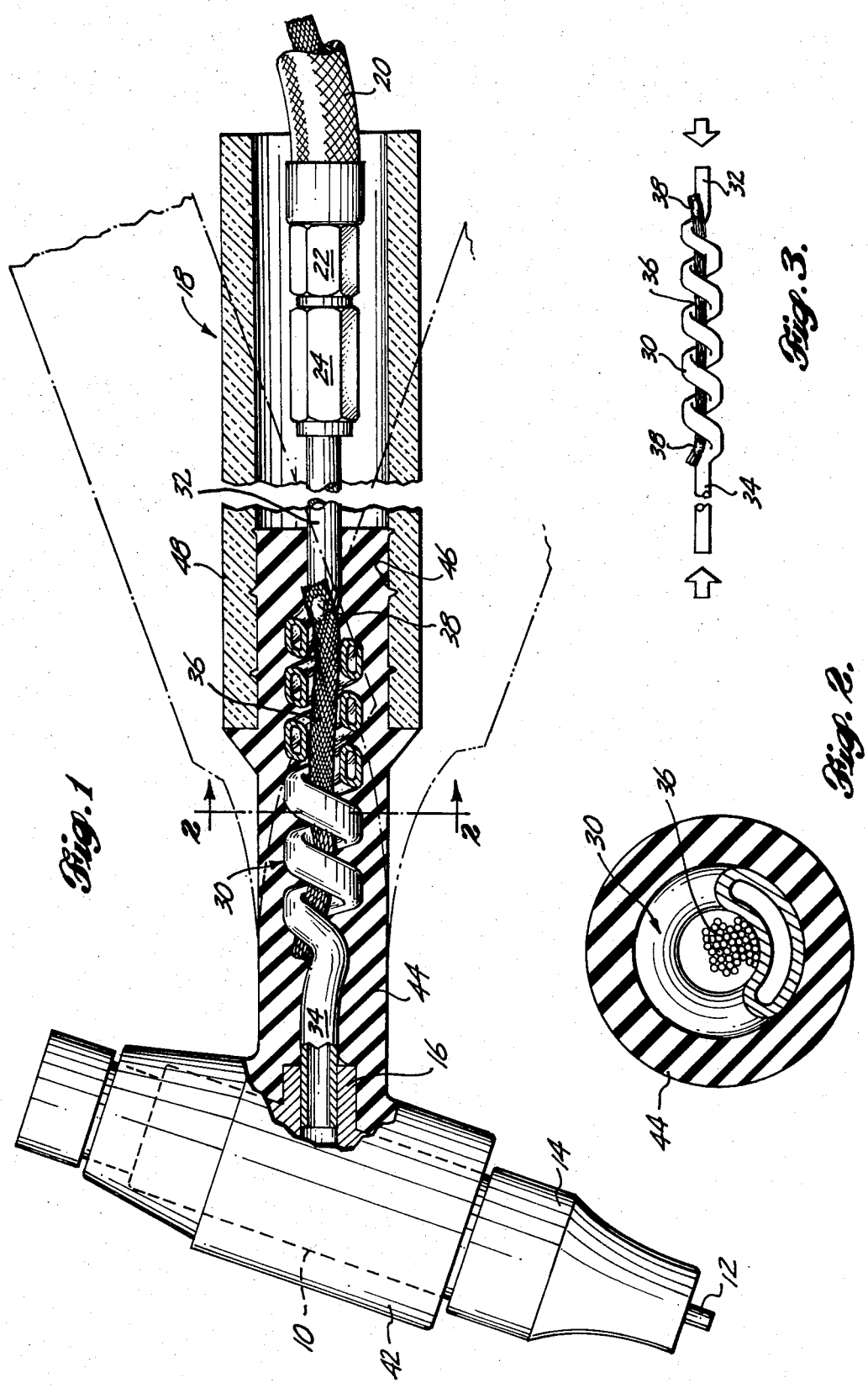
FIG. 1 is an enlarged side elevation, primarily in axial section, of an arc touch according to this invention.
FIG. 2 is a cross-section on line 2—2 of FIG. 1.
FIG. 3 shows in elevation the method of manufacture of the helical gas and current conductor element.

Referring to FIG. 1, the arc torch comprises the head 10 supporting the electrode 12 which is surrounded by the nozzle 14. At one side, head 10 has a neck 16 extending transversely outward, preferably inclined or angled rearward with respect to the axis of head 10 and the electrode.

Tubular handle 18, formed of insulative, non-conductive plastic material, receives the end of gas conduit 20 which encloses conductor 21. Coupler members 22, 24 are encased by handle 18.

Between coupler 24 and neck 16 is disposed the helical gas and current conductive element or assembly 30, so designated as a whole. Element 30 is in the form of a flexible cylindrical helix having an axial passage therethrough.

Preferably element 30 is formed of copper tubing for rapid heat transfer and high electrical conductivity. At its rear end element 30 has a shank 32 engaged by coupler 24 and, at its other end, shank 34 is secured in neck 16. The length of element 30 may vary and, thus, may include more or fewer coils than shown in FIG. 1 where, desirably, there are five such coils.

Element 30 is produced by coiling tubing about a mandrel with a fairly long lead as shown in FIG. 3. While in that extended condition an uninsulated multi-stranded electrical main conductor 36 is introduced into the axial passage and, at its ends, soldered at 38 firmly to element 30 near the end shanks 32/34. At this stage conductor 36 does not fill the axial passage. The spaces between coils of element 30 when newly formed will be substantially greater than in the finished assembly. Pressure, as indicated by arrows in FIG. 3, is applied oppositely to the ends 32/34 of element 30 which is compressed intermediately into a tighter helix. Such pressure causes the ends of conductor 36 to close toward each other. The stranded conductor 36 unlays itself and swells in the axial passage. This establishes contact with a large portion of the interior surfaces of the helical coils as shown in FIGS. 1 and 2.

The mandrel-coiling of the tubing in forming element 30 tends to flatten or make oval the otherwise circular cross-section of the tubing. As a result, when the multi-stranded conductor 36 is expanded or swelled as the helix length is reduced very intimate contact of the conductor 36 on the interior helix surfaces is established.

When shank 34 is seated and secured in neck 16 of head 10 the assembly is first packed about with elastomeric material 40, and then placed in a mold to shape and cure the elastomer and thus complete the main part of the torch. The head 10 is imbedded in the non-conductive sheath 42 and the helical element 30 is imbedded in neck sheath 44 which terminate with handle boss 46 to which is fitted the tubular handle 48.

It will be seen that that portion of the assembly between head 10 and handle 48 may be flexed (as indicated by dotted lines in FIG. 1) to numerous curvatures. Thereby the directional relation of the electrode 12 to the manually manipulated handle 48 may be varied so that the welder may conveniently direct the electrode at hard-to-reach positions. Flexing of the neck sheath portion 44 of the torch is accommodated both by the constructional features of the helical element 30 and the elastomeric nature of sheath 44.

The preferred elastomeric material to form sheaths 42, 44 is a silicone rubber compound which is readily available, easy to mold, and one that cures quickly.

In operation the coils of element 30 and the gas flowing therein do not appear to absorb heat from conductor 36; nor does element 30 heat up as would be the case if the current flow were restricted to element 30. Conductor 36 provides a short path for the current flowing to the electrode. It is observed that this avoids heating of element 30 and avoids heating of the gas which would otherwise occur if element 30 served as the main electrical conductor.

Tests have shown that when helical element 30 is operated as the sole conductor of both gas and current the temperature of element 30 rises to a high level. Inevitably the temperature of the gas flowing to head 10 can be such that little or no cooling is possible after an undesirably short time. In the same testing it was found that the addition of the conductor 36 as described appreciably reduced the rate of temperature rise in element 30 and, hence, in the inflowing gas. This materially deferred the occurrence of undesirable temperature conditions at head 10.

More specifically, tests were conducted with several torches in accordance with MilSpec W-80105A (26 Feb. 71). The torches were continuously operated for one hour each at 150 Amp. (DCSP). A temperature measuring device was employed to read temperatures inside the head of each torch.

With a torch having a straight and inflexible 3/16 inch brass tube in the place of helix 30 after 1 hour a temperature of 525°F. prevailed.

In a helical shank torch as disclosed herein, however not including flexible conductor 36 within a 3/16 inch copper coil, the temperature rose to 635°F.

By comparison a torch as disclosed herein with a flexible helix 30 being formed of 3/16 inch copper tubing and including a conductor 30 the attained temperature was 550°F. after 1 hour's continuous operation.

What is claimed is:

1. A gas-cooled, gas-shielded arc torch, comprising:
    an insulated torch head for supporting an electrode and a gas-directing nozzle surrounding said electrode, said head being devoid of supplemental coolant means;
    a neck extending transversely from said head at one side for supplying current to said electrode and gas to said nozzle;
    a gas and current conductive tubular metallic element in the form of a cylindrical single helix having an axial passage therethrough;
    a main current conductor in said axial passage secured conductively at its ends to portions of said element separated by several coils;
    flexible insulative means covering said element;
    gas and current supply means coupled to said element opposite said torch head; and
    handle means associated with said flexible insulative means to facilitate manipulation of said torch.

2. The structure of claim 1 in which said main current conductor is multi-stranded.

3. The structure of claim 2 in which said multi-stranded main current conductor swells to substantially fill said axial passage.

4. The structure of claim 1 in which the flexible insulative means is a cured elastomeric material.

* * * * *